US007561867B2

(12) United States Patent
Frye, Jr.

(10) Patent No.: US 7,561,867 B2
(45) Date of Patent: Jul. 14, 2009

(54) MULTI-UNIT POWER LINE COMMUNICATIONS SYSTEM AND METHOD

(75) Inventor: Bernard F. Frye, Jr., Mount Airy, MD (US)

(73) Assignee: Current Technologies, LLC, Germantown, MD (US)

( * ) Notice: Subject to any disclaimer, the term of this patent is extended or adjusted under 35 U.S.C. 154(b) by 681 days.

(21) Appl. No.: 11/388,985

(22) Filed: Mar. 27, 2006

(65) Prior Publication Data

US 2006/0222086 A1 Oct. 5, 2006

Related U.S. Application Data

(60) Provisional application No. 60/666,155, filed on Mar. 29, 2005.

(51) Int. Cl.
*H04M 9/00* (2006.01)
(52) U.S. Cl. ............... 455/402; 455/3.01; 455/11.1; 340/310.11; 370/315
(58) Field of Classification Search ............ 455/402, 455/3.01, 11.1; 340/310.11; 370/315
See application file for complete search history.

(56) References Cited

U.S. PATENT DOCUMENTS 7,139,580 B2 * 11/2006 Stein et al. ............... 455/456.1

| | | | |
|---|---|---|---|
| 2001/0046840 A1 * | 11/2001 | Kim ............................. | 455/7 |
| 2004/0113757 A1 * | 6/2004 | White et al. ............ | 340/310.01 |
| 2004/0160928 A1 * | 8/2004 | Perlman ...................... | 370/338 |
| 2004/0185794 A1 * | 9/2004 | Jeong et al. .................... | 455/78 |
| 2005/0065743 A1 * | 3/2005 | Cumming et al. ............. | 702/62 |
| 2006/0082219 A1 * | 4/2006 | Gerszberg et al. .............. | 307/1 |

* cited by examiner

*Primary Examiner*—Danh C Le
(74) *Attorney, Agent, or Firm*—Mel Barnes; Capital Legal Group, LLC

(57) ABSTRACT

A power line communications system and method for multi-dwelling unit structures that provides broadband communications for internet access, voice over IP (VoIP), streaming video, audio, and other high speed applications and services is provided. One example embodiment includes a first communication device comprising an upstream port and a downstream port. The embodiment also includes a plurality of second communication devices with each second communication device configured to provide communications to user devices located on a different floors. The second communication devices may each include a low voltage power line port configured to communicate with a plurality of user devices via a low voltage power line and a second port for communicating with the first communication device. The first and second devices may also include router functionality.

19 Claims, 10 Drawing Sheets

MULTI-UNIT POWER LINE COMMUNICATIONS SYSTEM AND METHOD

CROSS-REFERENCE TO RELATED APPLICATIONS.

This application claims priority to U.S. Provisional Patent Application Ser. No. 60/666,155 filed Mar. 29, 2005; which is incorporated herein by reference in its entirety.

FIELD OF THE INVENTION

The present invention generally relates to data communications over a power distribution system and more particularly, to a power line communications system for providing communications to apartment buildings, hospitals, hotels, office buildings and other multi-dwelling unit structures.

BACKGROUND OF THE INVENTION

Well-established power distribution systems exist throughout most of the United States, and other countries, which provide power to customers via power lines. With some modification, the infrastructure of the existing power distribution systems can be used to provide data communication in addition to power delivery, thereby forming a power line communication system (PLCS), which may be a broadband communication system. In other words, existing power lines that already have been run to and through many homes and offices, can be used to carry data signals to and from the homes, buildings, and offices. These data signals are communicated on and off the power lines at various points in the power line communication system, such as, for example, near homes, offices, Internet service providers, and the like.

Thus, there is a need for a power line communications system and method for multi-dwelling unit structures to provide broadband communications for internet access, voice over IP (VoIP), streaming video, audio, and other high speed applications. These and other advantages may be provided by various embodiments of the present invention.

SUMMARY OF THE INVENTION

The present invention provides a power line communications system and method for multi-dwelling unit structures that provides broadband communications for internet access, voice over IP (VoIP), streaming video, audio, and other high speed applications and services. One example embodiment includes a first communication device comprising an upstream port and a downstream port. The embodiment also includes a plurality of second communication devices with each second communication device configured to provide communications to user devices located on a different floors. The second communication devices may each include a low voltage power line port configured to communicate with a plurality of user devices via a low voltage power line and a second port for communicating with the first communication device. The first and second devices may also include router functionality.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

Figure 1:
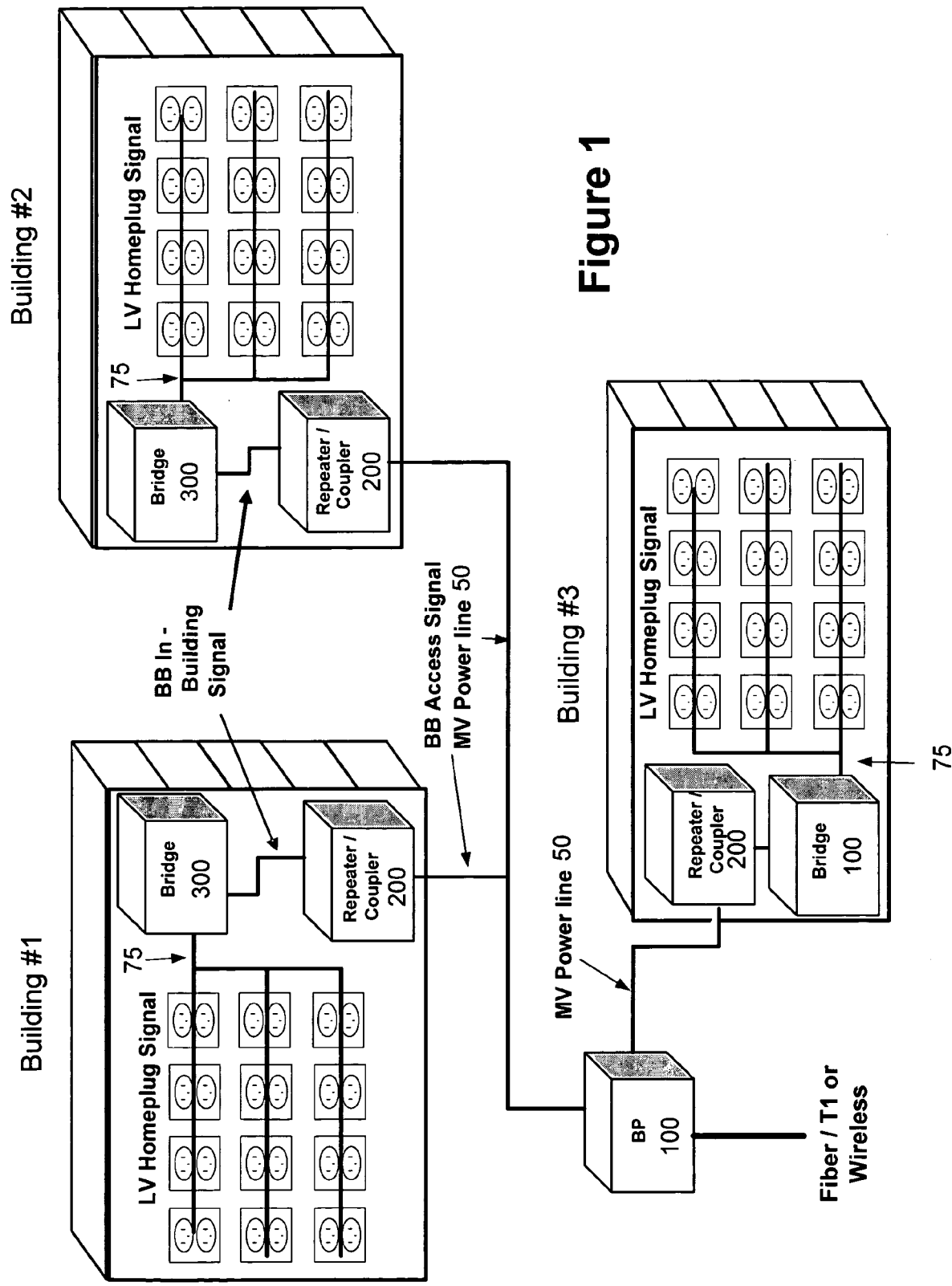
FIG. 1 is a schematic diagram of an example power line communication system servicing multiple structures, according to the present invention.

In the following description, for purposes of explanation and not limitation, specific details are set forth, such as particular networks, communication systems, computers, terminals, devices, components, techniques, data and network protocols, software products and systems, operating systems, power line communications systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, terminals, devices, power line communications systems, components, techniques, data and network protocols, software products and systems, operating systems, development interfaces, and hardware are omitted so as not to obscure the description of the present invention.

System Architecture and General Design Concepts

Power distribution systems may include components for power generation, power transmission, and power delivery. A power generation source generates a voltage and a transmission substation increases this voltage to high voltage (HV) levels for long distance transmission on HV transmission lines to a substation transformer. Typical voltages found on HV transmission lines range from 69 kilovolts (kV) to in excess of 800 kV.

In addition to HV transmission lines, power distribution systems include medium voltage (MV) power lines and low voltage (LV) power lines. As discussed, MV typically ranges from about 1000 V to about 100 kV, and LV typically ranges from about 100 V to about 200 V. Transformers are used to convert between the respective voltage portions, e.g., between the HV section and the MV section and between the MV section and the LV section. Transformers have a primary side for connection to a first voltage (e.g., the MV section) and a secondary side for outputting another (usually lower) voltage (e.g., the LV section). Such transformers are often referred to as distribution transformers or a step down transformers, because they "step down" the voltage to some lower voltage. Transformers, therefore, provide voltage conversion for the power distribution system. Thus, power is carried from a substation transformer to a distribution transformer over one or more MV power lines. Power is carried from the distribution transformer to the customer premises via one or more LV power lines.

In addition, a distribution transformer may function to distribute one, two, three, or more phase power signals to the structure, depending upon the demands of the user. In the United States, for example, these local distribution transformers typically feed anywhere from one to ten homes, depending upon the concentration of the customer premises in a particular area. Distribution transformers may be pole-top transformers located on a utility pole, pad-mounted transformers located on the ground, or transformers located under ground level.

Power Line Communication System

The present invention may include communications devices such as backhaul points and bypass devices to communicate data. In some instances, the backhaul point may be coupled to a power line (e.g., a MV power line) or a coaxial cable, and to a non-power line medium for communications link, which may form a backhaul link. One or more bypass devices may be coupled to the backhaul point via the MV power line or coaxial cable (or alternately via a low voltage power line, a coaxial cable, a T-1 line, a fiber optic cable, wirelessly (e.g., 802.11 or satellite such as WildBlue®), or via another communications medium). The system may also employ power line repeaters (indoor, outdoor, low voltage (LVR) and/or medium voltage) that may be remotely configured and enabled/disabled to extend the communications range of other elements. The PLCS (and the network elements thereof) may be monitored and controlled via a power line server that may be remote from the structure and physical location of the network elements. Examples of bypass devices, backhaul points, repeaters, power line servers, and other components are described provided in U.S. application Ser. No. 60/633,737, entitled "Power Line Repeater and Method," filed Dec. 6, 2004; and U.S. application Ser. No. 11/091,677 entitled "Power Line Repeater and Method," filed Mar. 28, 2005; and U.S. application Ser. No. 10/973,493, entitled "Power Line Communications System and Method of Operating the Same," filed Oct. 26, 2004, all of which are hereby incorporated by reference in their entirety.

The present invention may provide high speed internet access and streaming audio services to each room, office, apartment, or other sub-unit of the structure via Homeplug®, IEEE 802.11 (Wifi), or other suitable method. For example, the lobby and other congregation areas of the building may be serviced via Wifi, while individual rooms may be serviced via Homeplug.

FIG. 1 illustrates an example multi-building multi-dwelling unit (MDU) embodiment that includes a backhaul point (BP) 100 connected to the internet via a fiber optic cable (or other backhaul link) and point of presence (POP) (not shown). The BP 200 is connected to three buildings via their respective MV power lines 50, which, therefore, carries the broadband (BB) over power line (BPL) access signals for each structure. The broadband signals are coupled onto and off the MV power lines 50 via a coupler (e.g., an inductive or capacitive coupler) in or at each building that is communicatively coupled to a repeater 200. Each repeater 200 may be connected to one or more bypass devices (referred to herein and in the figures as "bridges" 300). Each bridge 300 may be connected to one or more LV power lines 75 for communicating Homeplug signals to and from the user devices connected to the LV power lines 75 at one or more electric wall sockets.

Figure 2:
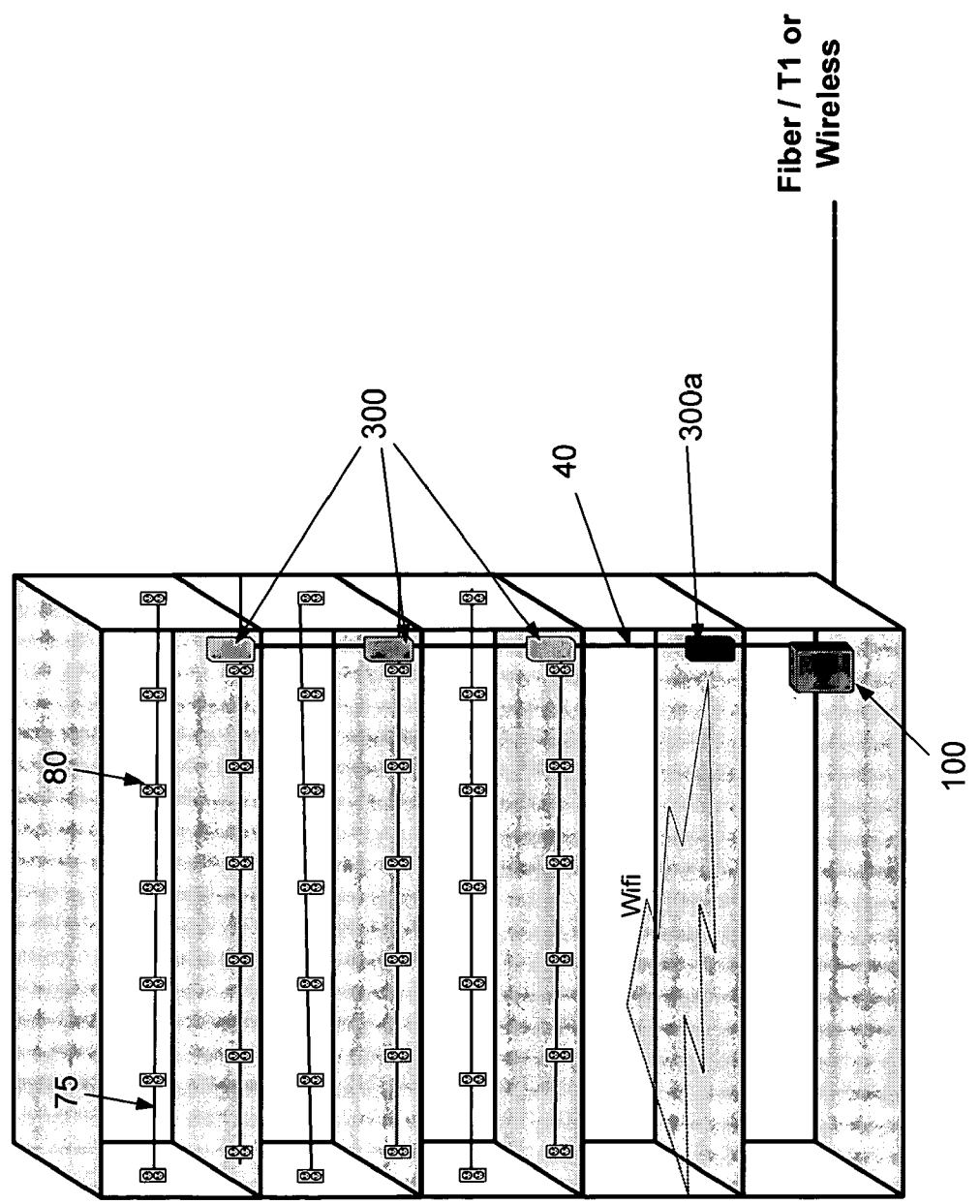
FIG. 2 is a schematic diagram of an example power line communication system servicing one structure, according to the present invention.

FIG. 2 illustrates another example embodiment of the present invention. As shown in the figure, the backhaul link connected to the BP 100 may be a fiber optic cable. The BP 100 is also connected to a plurality of bridges 300 via a coaxial cable 40, or another non-power line medium. In this embodiment, there is one bridge on each floor. Alternate embodiments may have more than one bridge 200 on each floor such a one bridge 300 per side or quarter of the floor. Other embodiments may include one bridge 300 for every two, three, four or other increment of floors. The bridges 300 may be connected to the coaxial cable link via a T connection or in series. Each bridge 300 may service its respective user devices (e.g., connected to electric wall sockets 80) by providing broadband (BB) communications via the low voltage power lines 75 of the associated floor or floors (or portion thereof). In this example, the bottom floor, which may be a lobby, is serviced via a bridge 300a that has a wireless transceiver (e.g., a Wifi transceiver—IEEE 802.11a,b, org) instead or in addition to a LV power line transceiver. The wireless transceivers may be suitable for covering open areas such as a lobby, restaurant, pool, etc.

Figure 3:
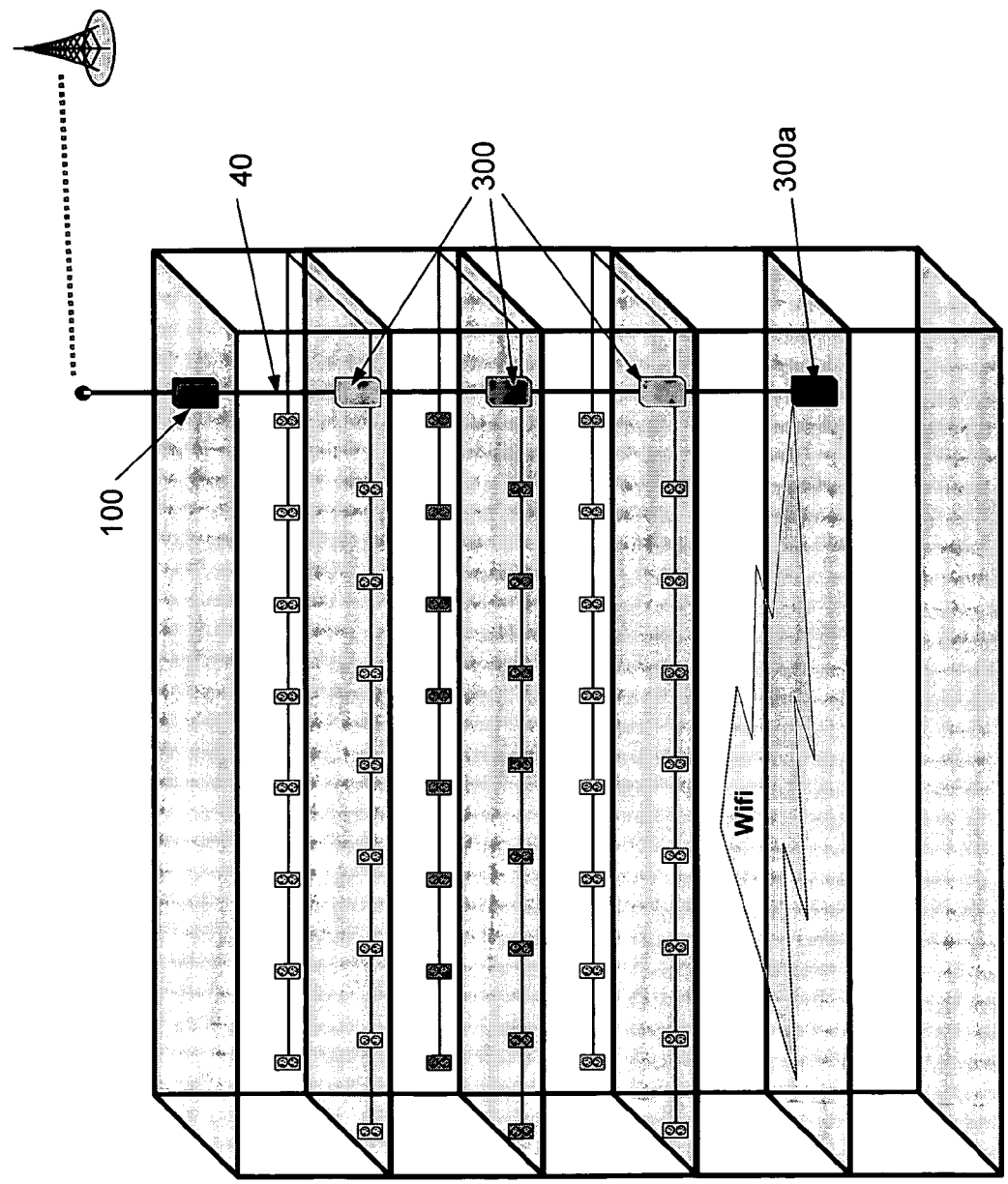
FIG. 3 is a schematic diagram of another example power line communication system servicing one structure, according to the present invention.

FIG. 3 illustrates another example embodiment of the present invention. This embodiment is similar to that shown in FIG. 2 except that the BP 100 is on or near the top of the building and may have a wireless transceiver (which may be a satellite trasnsceiver) for communicating via a wireless backhaul link. The BP 100 may use a dedicated coaxial cable 40 to communicate with its bridges 300, or may share a coaxial cable with a digital broadcast satellite (e.g., such as DirecTV® which provides video) (not shown) using a different frequency from the coaxial satellite transmissions. In other embodiments, the BP 100 may be on a middle floor and use a fiber or wireless backhaul link. As in the previous embodiment, the bridges 300 are connected to the coaxial cable on a first port (for communication with the BP 100) and to the LV power lines 75 on a second port to provide communications to user device connected to the LV power lines 75 (directly or indirectly). Bridge 300a, as described above, includes a wireless port instead of or in addition to a LV port.

Figure 4:
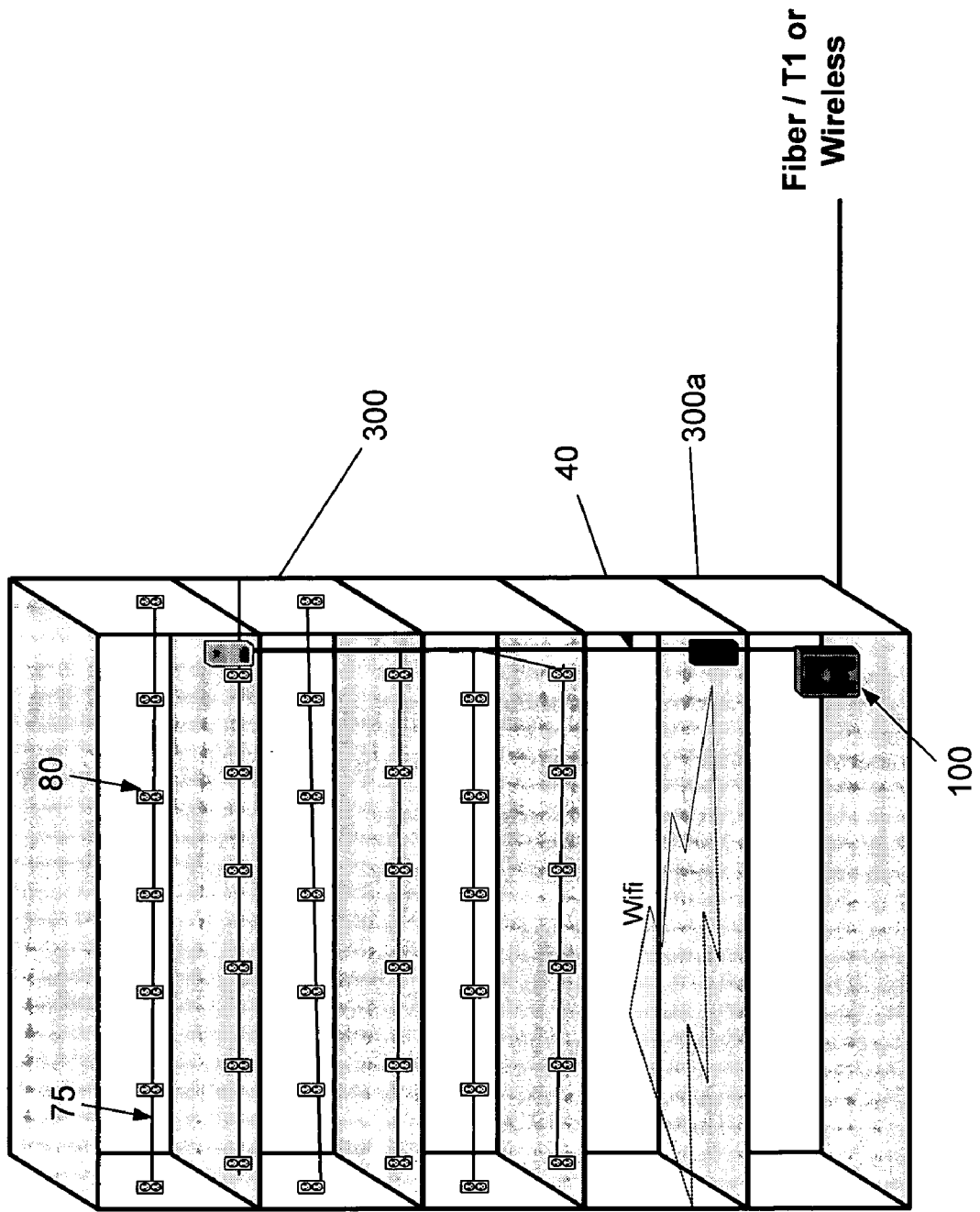
FIG. 4 is a schematic diagram of yet another example power line communication system servicing one structure, according to the present invention.

FIG. 4 illustrates another example embodiment of the present invention. This embodiment is similar to that shown in FIG. 2 except that one bridge 300 may service multiple floors or the entire building.

Figure 5:
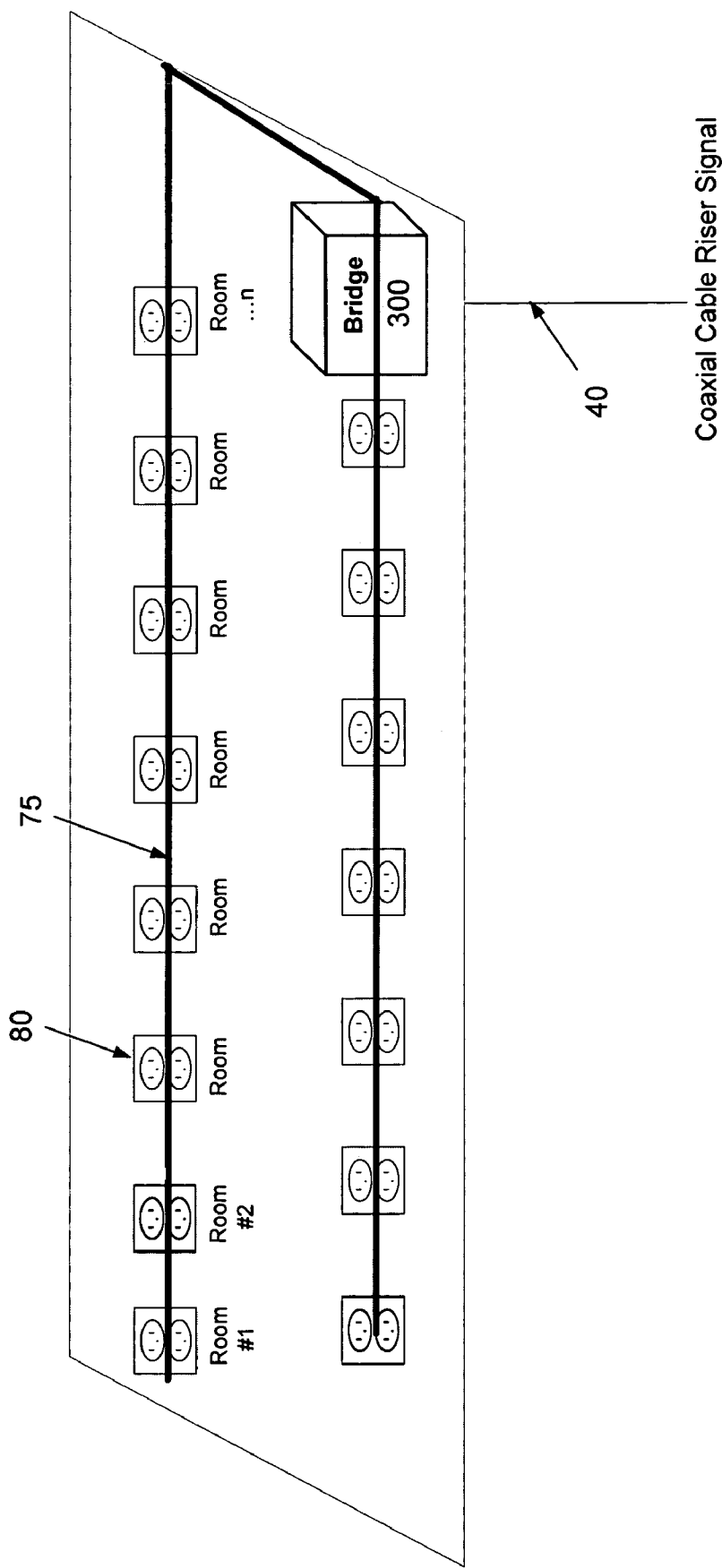
FIG. 5 is a schematic diagram of a portion of an example power line communication system servicing one floor, according to the present invention.

FIG. 5 illustrates an example embodiment of the connection of a bridge 300 to the LV power lines 75 for one floor that may be used in some of the embodiments of the present invention. In this example, the bridge 300 is electrically and communicatively connected to all the outlets 80 on the floor via multiple power lines 75. The connection may be made at the circuit breaker box or at the power meter (not shown in this figure). In some embodiments, each outlet may be provided communications via a HomePlug® or other signal.

Figure 6:
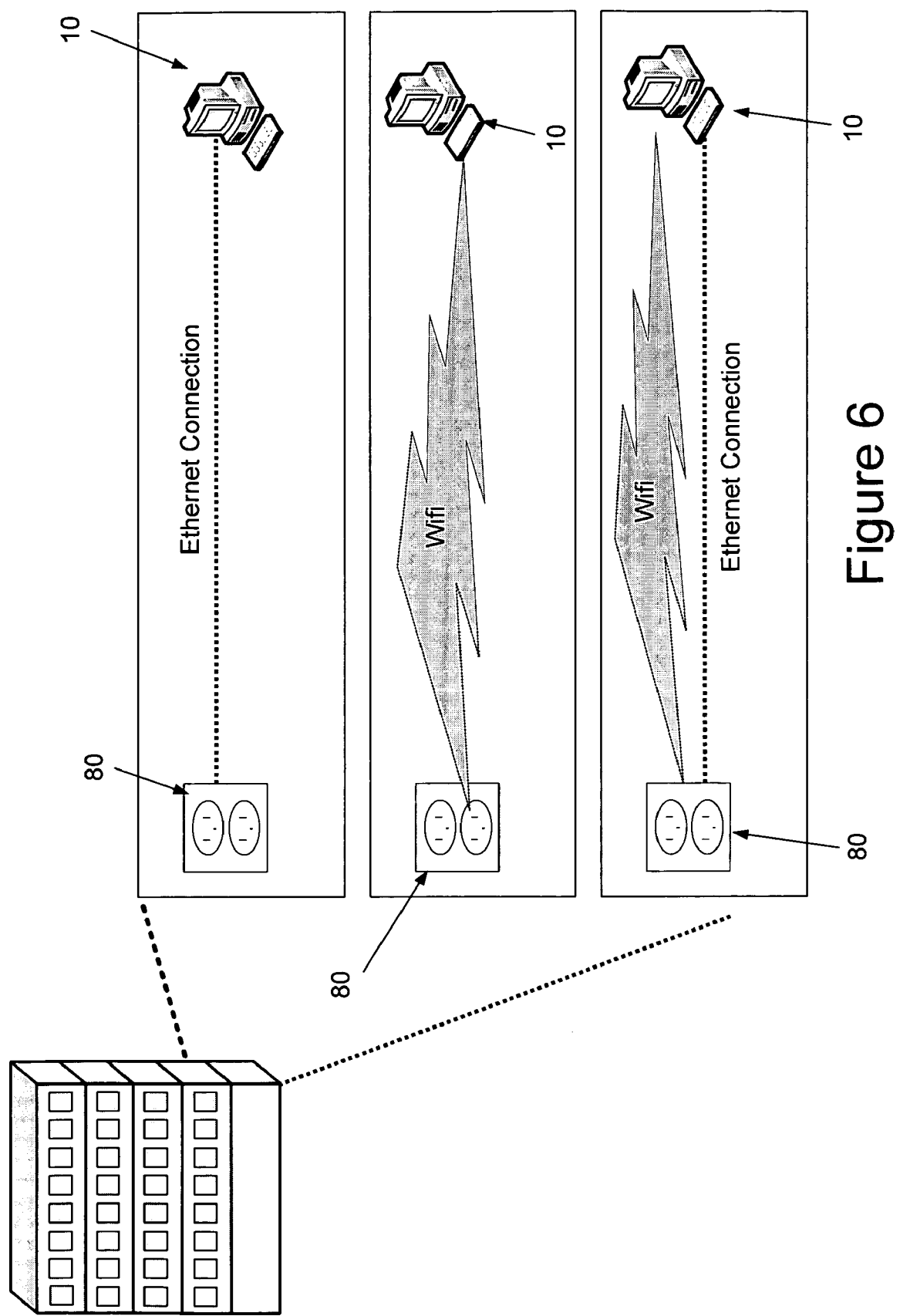
FIG. 6 is a schematic diagram illustrating methods of servicing user devices, according to example embodiments of the present invention.

FIG. 6 illustrates an example embodiment of the connections between the user devices 10 and wall sockets 80 of the LV power lines, which may be Ethernet, wireless, or the combination thereof. Included in this example of course, but not shown, is a suitable transceiver such as a power line modem with an Ethernet port, power line modem coupled to (or integrated with) a wireless transceiver (e.g., Wifi), which may also have an Ethernet port (to provide both a wireless and Ethernet connection for one or more devices). In addition, the connection from the power line modem to the user device may be via a coaxial cable, Ethernet, or a component video cable (and signal), or combination thereof. The data communicated may include audio (e.g., MP3), audio/video (e.g., MPEG 3 or MPEG 4), including video-on demand from a content server that is local (in the building) or remote.

Figure 7:
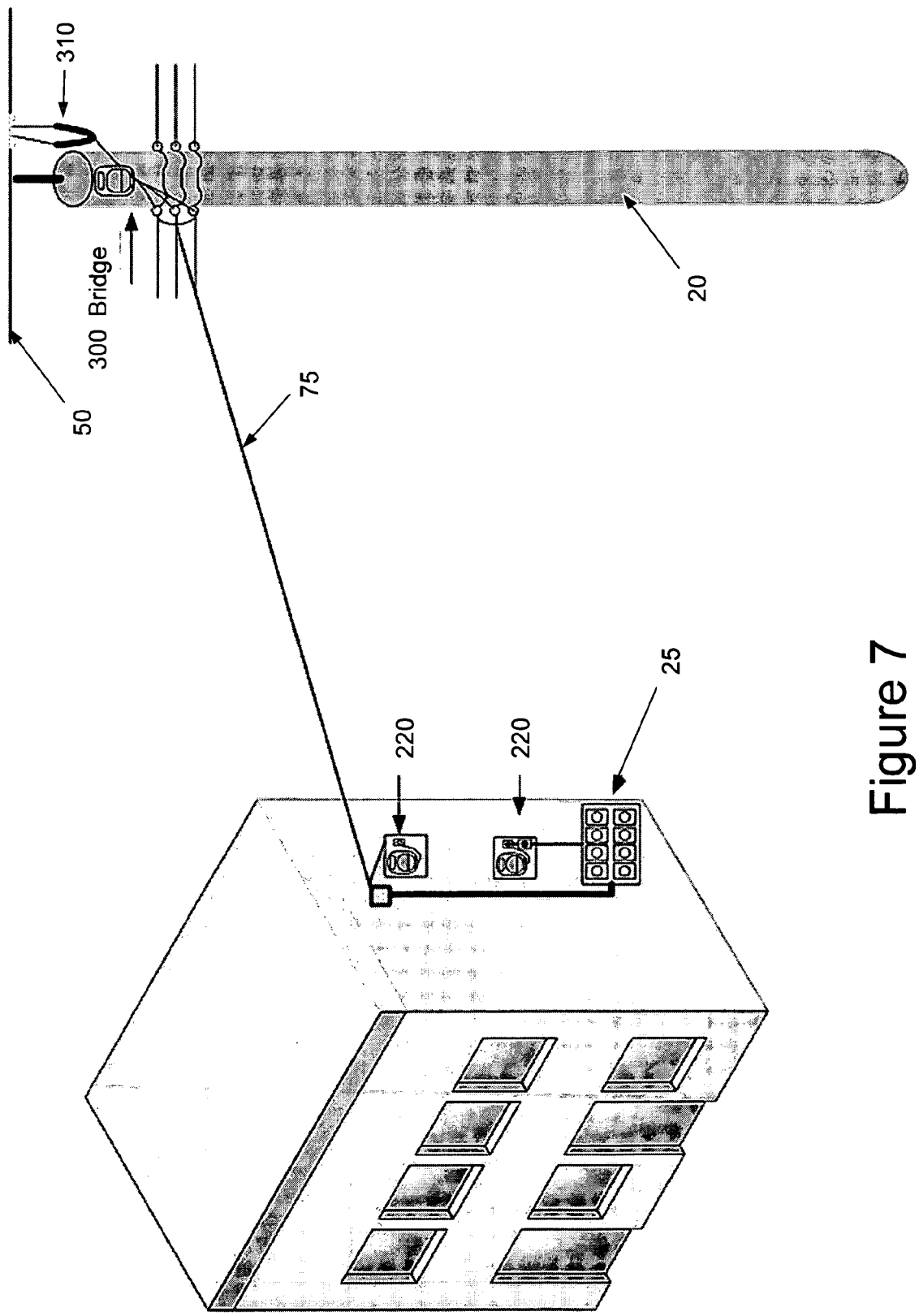
FIG. 7 is a schematic diagram of another example power line communication system servicing a structure, according to the present invention.

FIG. 7 illustrates an example embodiment of the present invention in which the bridge 200 is mounted to a utility pole 20 (but could be mounted adjacent a pad mounted transformer) and is communicatively coupled to the MV power line 50 via a MV coupler 310. The bridge 300 is also connected to the LV power lines 75 that service the structure. At the structure, a low voltage repeater may 220 be installed at one or more meters 25 or at one or more circuit breaker panels. In general, the bridge 300 (or repeater 220 in this instance) may be connected to the LV wiring 75 at the power usage meter 25 or at the circuit breaker panel in any of the embodiments herein. Thus, the data signals may traverse the internal LV wiring of the building, the external LV power lines 75 extending to the bridge 300, through the bridge 300, MV coupler 310, and over the MV power lines 50 to a BP (not shown).

Figure 8:
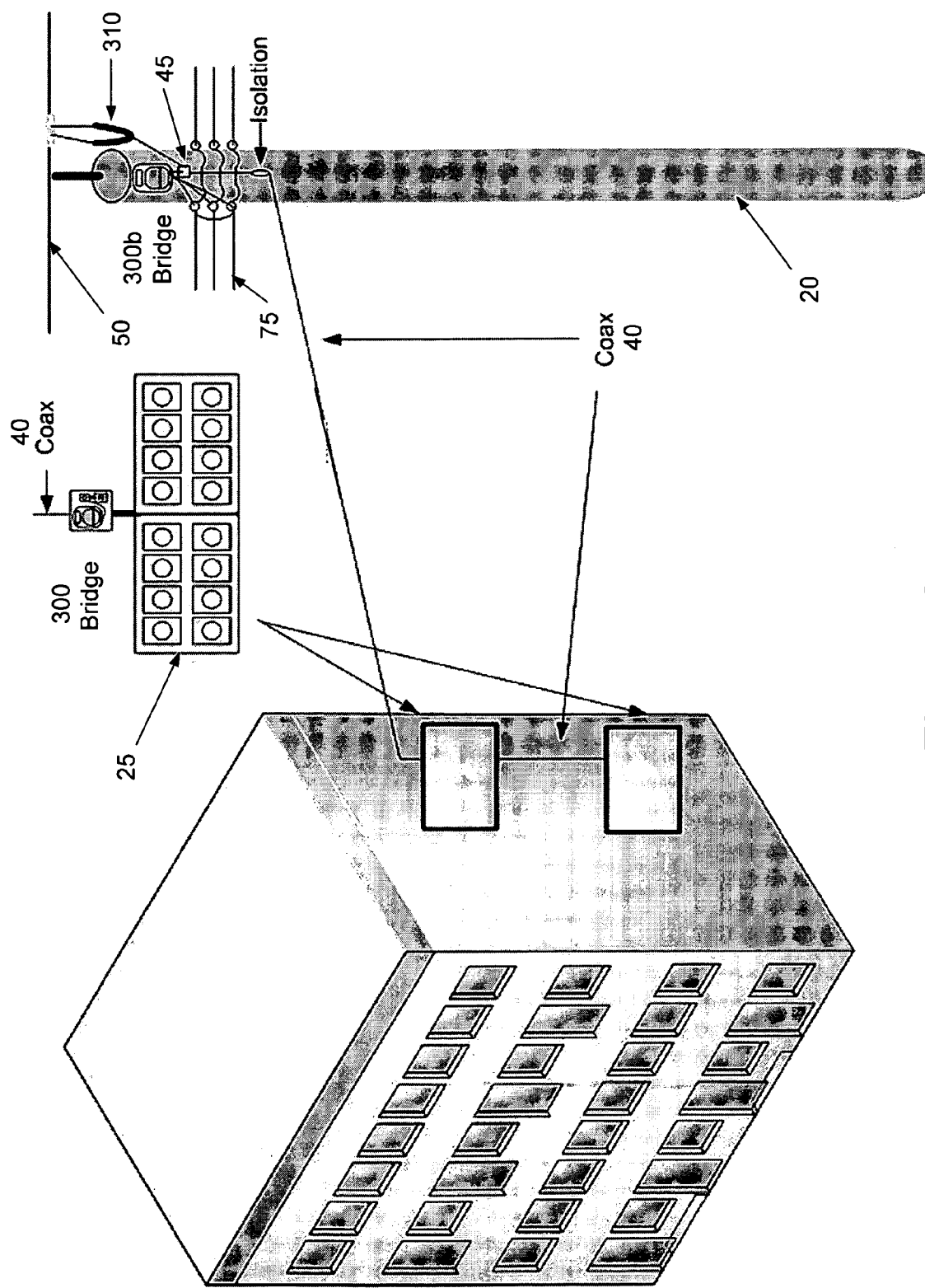
FIG. 8 is a schematic diagram of still another example power line communication system servicing a structure, according to the present invention.

FIG. 8 illustrates another example embodiment of the present invention in which a bridge 300 is mounted to a utility pole 20 (but could be mounted adjacent a pad mounted transformer) and communicatively coupled to the MV power line 50 via a MV power line coupler 310. At the structure, either inside or outside, one or more bridges 300 may be installed (connected to the LV power line 75 subnets via the circuit breaker panel or power usage meter 25). The bridges 300 may be coupled together via a coaxial cable 40 that is on the inside or outside of the building. The MV power line coupler cable includes a splitter 45 that allows the bridge 300b at the pole to communicate over the MV power line 50 (for other customers not shown in the figure). The other side of the splitter 45 is connected to a coaxial cable 40 that extends to the structure and is connected to the bridges 300 therein. Thus, the bridges 300 in the building and the bridge 300b at the pole may share one MV coupler 310 for communicating over the MV power line 50 to a BP (not shown).

Figure 9:
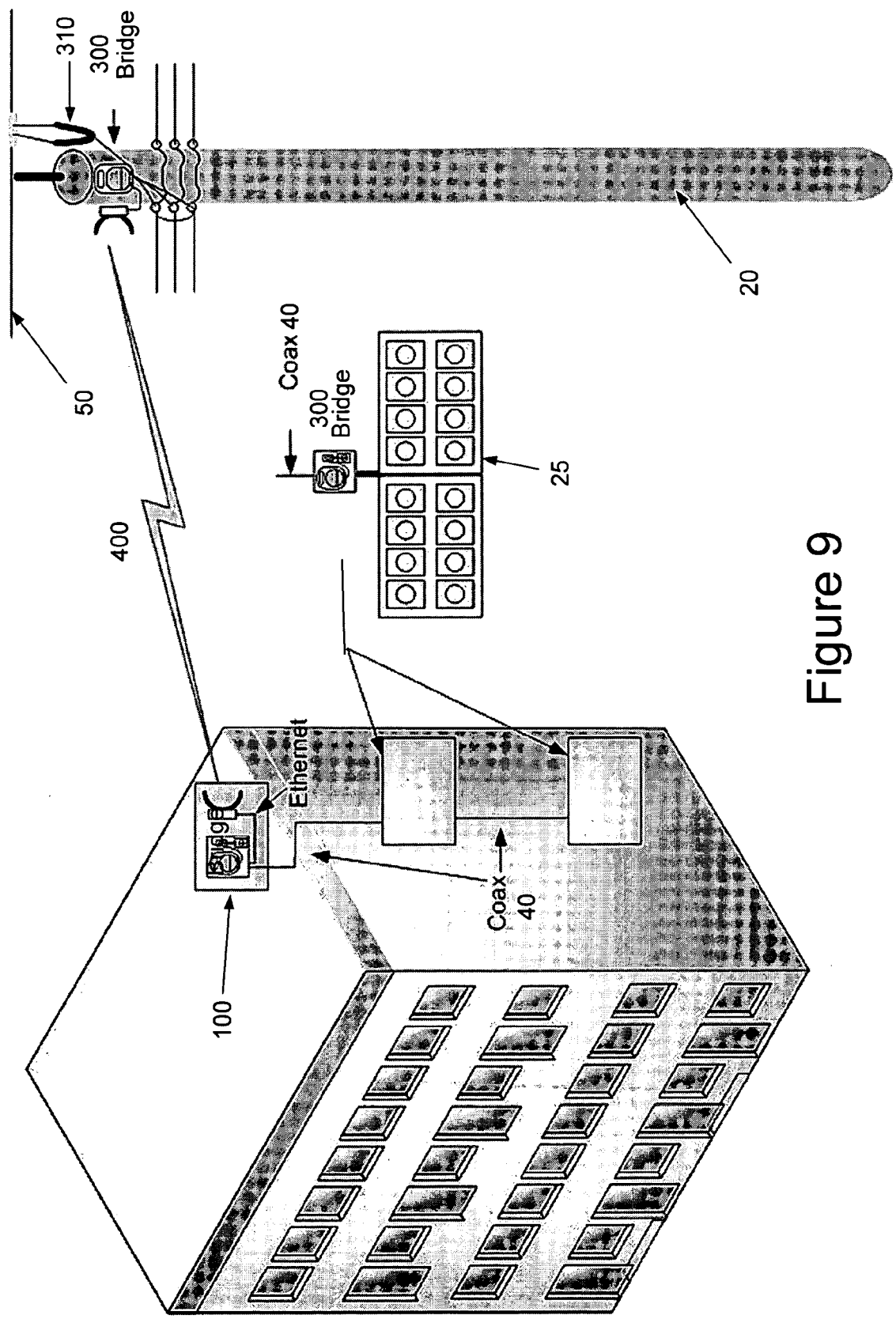
FIG. 9 is a schematic diagram of yet another example power line communication system servicing a structure, according to the present invention.

FIG. 9 illustrates another example embodiment of the present invention in which a bridge 300 is mounted to a utility pole 20 (but could be mounted adjacent a pad mounted transformer) and communicatively coupled to the MV power line 50 via an MV power line coupler 310. At the structure, such as, for example, near the roof, the top, and/or on the outside, a backhaul point 100 may be mounted. The bridge 300 and backhaul point 100 may communicate via a wireless link 400, such as an IEEE 802.11 or 802.16 link. One or more bridges 300 may be connected to the backhaul point 100 via a coaxial cable 40 (that may be disposed on the exterior of the building) and be installed (connected to the LV power line subnets) at the power usage meters 25 as shown. Signals to and from the BP 100 may be communicated via the MV power line 50 to a another BP (not shown) via the wireless link 400 and bridge 300 at the pole 20.

Figure 10:
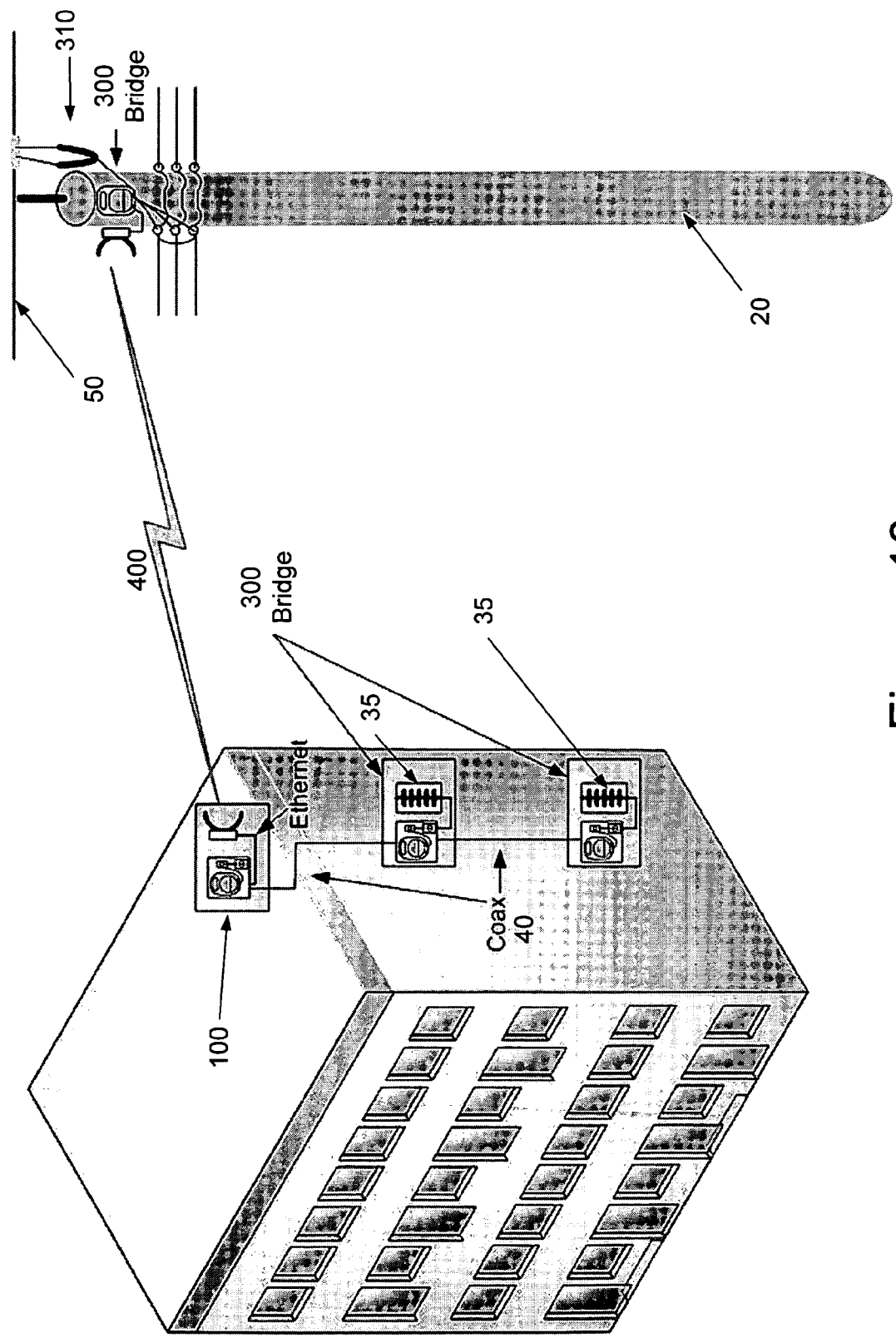
FIG. 10 is a schematic diagram of another example power line communication system servicing one structure, according to the present invention.

The example embodiment of FIG. 10 is similar to that of FIG. 9 except that the bridges 300 are installed at the breaker panels 35 (instead of at the power usage meters 25) and the connecting coaxial cable(s) 40 are inside the building. It is worth noting that in the figures the bridge 30 is sometimes referred to as a PLB (Power Line Bridge).

In any of the embodiments herein, a video recorder (VR) may be installed in the building or each floor and store a catalog of movies for the building (or floor) occupants to view upon transmitting a request via the PLCS. Thus, the VR or other recording device may provide on-demand video to the building or floor occupants. Alternately, the building (or floor) occupants may select which videos to record on the building (or floor) VR for later viewing. The present invention also may facilitate and control in-building multi-player gaming, which may be controlled (if necessary) by the bridge or backhaul point.

Thus, the present invention may be used to provide room-per-room high speed Internet services, streaming personalized music services through internet, VoIP, integrated video (e.g., on demand and/or streaming) and on-screen surfing applications, secure, encrypted access and data transmission. In addition, the system may be fully managed, requiring no user software, and permit the user to use the system simply by registering. Once registered, the system may record the information identifying the user and permit the user to use the system anywhere in or near structure(s) (e.g. at the pool, in their room, at a restaurant, etc.) without the need to re-register. This may be accomplished by assigning the user a username and password for use during his or her stay or recognizing the computer (e.g., a MAC address). Upon checkout or some other triggering event, the system can prevent further access by the user by disabling access by the username or MAC address.

In addition, the system may facilitate or be integrated with hotel billing and activation systems so that system usage charges (e.g., on demand videos, broadband usage, VoIP, audio streaming charges, etc.) are communicated to the hotel billing system for inclusion on the user's bill. In addition, upon check out, the hotel computer system may automatically transmit a notification to the PLS (or other computer system), which may remotely de-activate (e.g., turn off) one or more of the electrical appliances in the user's hospital room, office, or hotel room. For example, the system may turn off or otherwise control (e.g., to limit the power consumption thereof) the lights, televisions, stereos, air conditioning, heating, refrigerators, ovens, stoves, dish washers, clocks, washers, dryers, computers, printers, and other such electrical consumption devices.

As illustrated in the incorporated references, example bridges 300 may includes a MV power line interface (MVI), a LV power line interface (LVI) and a controller coupled to the MVI and LVI and which controls operation of the LVI and MVI. The bridge 300 may be controlled by a programmable processor and associated peripheral circuitry, which form part of the controller. The controller includes memory that stores, among other things, routing information and program code, which controls the operation of the processor.

The LVI may include a LV power line coupler coupled to a LV signal conditioner, coupled to a LV modem (e.g., a HomePlug® compatible modem). The router, which may be formed by the controller may perform routing functions using layer 3 data (e.g., IP addresses), layer 2 data (e.g., MAC addresses), or a combination of layer 2 and layer 3 data (e.g., a combination of MAC and IP addresses). The MVI may include a MV modem coupled to a MV signal conditioner, coupled to a power line coupler. In addition to routing, the controller may perform other functions including controlling the operation of the LVI and MVI functional components and responding to power line server commands and requests.

Depending on the implementation and/or configuration, a backhaul point 100 may include a MVI (with a modem) or other interface for communication with one or more bridges and/or repeaters. In addtion, the BP 100 may include an upstream interface having a transceiver for communication over a backhaul link, which may comprise a T-1 line, a DSL, a coaxial cable (DOCSIS or Homeplug modem), or a wireless link and have a suitable transceiver. Additionally, the BP 100 may include a controller for routing data and performing other control functions. Router, as user herein, may include a switch, bridge, or router for communicating data packets and their associated functions. For example, the bridge may route data by providing a first data packet that includes the data and a destination address of the one or more user devices. Similarly, the backhaul point may route data by providing a data packet that includes the data and a destination address of the one or more bridges. Finally, the router may (or controller) of the bridge and/or backhaul point may provide prioritization of upstream and/or downstream data, to provide QoS for latency sensitive applications such as VoIP, video, and other applications.

This embodiment of the bridge provides bidirectional communications using time division multiplexing, frequency division multiplexing, or other scheme. Thus, bridge 300 can receive and transmit data to one or more user devices in one or more customer premises via the LVI, which may be connected to a plurality of customer premises (e.g., apartments) via one or more of LV power lines. In addition, the bridge may receive and transmit data with other network elements, such as one or more the BPs and other bridges, via the MVI.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A system for providing power line communications to units in a plurality of floors of a structure, wherein each floor includes one or more one low voltage power line; the system comprising:
    a first communication device comprising an upstream port and a downstream port;
    a plurality of second communication devices, wherein at least some of said second communication devices are configured to provide communications to user devices located on a different one of said plurality of floors;
    wherein each of said plurality of second communication devices includes a low voltage power line port configured to communicate with a plurality of user devices via a low voltage power line;
    wherein each of said plurality of second communication devices includes second port; and
    wherein each of said second communication devices is communicatively coupled to said first communication device via said second port.

2. The system of claim 1, wherein each said second communication device includes a first modem coupled to said power line port and a router communicatively coupled to said first modem.

3. The system of claim 2, wherein said first communication device includes a router communicatively coupled to said upstream port and said downstream port.

4. The system of claim 1, wherein said first communication device includes a router communicatively coupled to said upstream port and said downstream port.

5. The system of claim 1, wherein said upstream port of said first communication device includes a fiber optic transceiver.

6. The system of claim 1, wherein said first communication device includes a satellite receiver.

7. The system of claim 1, wherein said upstream port of said first communication device includes a first wireless transceiver.

8. The system of claim 7, further comprising a third communication device coupled to a power line and including a second wireless transceiver configured to communicate with said first communication device.

9. The system of claim 8, wherein said third communication device is coupled to a medium voltage power line.

10. The system of claim 1, further comprising a third communication device including a wireless transceiver configured to provide communications to a plurality of user devices; and
    wherein said third communication device includes a device port configured to communicate with said first communication device.

11. The system of claim 1, wherein said first communication device is coupled to said plurality of second communication devices via at least one repeater.

12. The system of claim 1, wherein said first communication device is coupled to said plurality of second communication devices via a low voltage power line.

13. The system of claim 1, wherein said first communication device is coupled to said plurality of second communication devices via a non-power line medium.

14. The system of claim 1, wherein said first communication device is located at the structure.

15. The system of claim 1, wherein said first communication device is located remote from the structure.

16. The system of claim 1, further comprising a third communication device configured to communicate over a medium voltage power line and communicatively coupled to said first communication device.

17. A system for providing power line communications to a plurality user devices in a plurality of units in a plurality of floors of a structure, wherein each floor includes one or more one low voltage power line, the system comprising:
    a first communication device comprising an upstream port and a downstream port;
    a plurality of second communication devices, wherein at least some of said second communication devices are configured to provide communications to a different one of said plurality of floors;
    wherein each said second communication device includes a second port and a low voltage power line port configured to communicate with a plurality of user devices via a low voltage power line;
    wherein each said second communication device includes a first modem coupled to said power line port and a router communicatively coupled to said first modem;

wherein each of said plurality of second communication devices is communicatively coupled to said first communication device via said second port;

a third communication device including a first wireless transceiver configured to provide communications to a plurality of user devices; and wherein said third communication device includes a port configured to communicate with said first communication device.

18. The system of claim 17, wherein said first communication device includes a router communicatively coupled to said upstream port and said downstream port.

19. The system of claim 17, wherein said upstream port of said first communication device includes a second wireless transceiver.

* * * * *

UNITED STATES PATENT AND TRADEMARK OFFICE
CERTIFICATE OF CORRECTION

PATENT NO. : 7,561,867 B2
APPLICATION NO. : 11/388985
DATED : July 14, 2009
INVENTOR(S) : Bernard F. Frye, Jr.

It is certified that error appears in the above-identified patent and that said Letters Patent is hereby corrected as shown below:

In column 1, line 5, delete "APPLICATIONS." and insert -- APPLICATIONS --, therefor.

In column 2, line 32, delete "invention;" and insert -- invention. --, therefor.

In column 4, line 29, delete "802.11a,b, org)" and insert -- 802.11a,b, or g) --, therefor.

In column 4, line 37, delete "trasnsceiver)" and insert -- transceiver) --, therefor.

In column 7, line 1, delete "addtion," and insert -- addition, --, therefor.

In column 7, line 19, delete "bidirectional" and insert -- bi-directional --, therefor.

In column 8, line 52, in Claim 17, before "user" insert -- of --.

Signed and Sealed this

Sixth Day of October, 2009

David J. Kappos
*Director of the United States Patent and Trademark Office*